United States Patent [19]

Langner

[11] 4,261,671

[45] Apr. 14, 1981

[54] CORRUGATED PIPE FOR DEEPWATER APPLICATIONS

[75] Inventor: Carl G. Langner, Houston, Tex.

[73] Assignee: Shell Oil Company, Houston, Tex.

[21] Appl. No.: 836,648

[22] Filed: Sep. 26, 1977

[51] Int. Cl.² .................................................. F16L 1/00
[52] U.S. Cl. ...................................... 405/166; 405/158; 138/173; 226/172; 242/54 R
[58] Field of Search .......................... 61/108, 72.4, 72.6, 61/72.2, 45 R; 138/173; 226/172, 171, 195, 6, 56; 254/137; 242/54 R, 147

[56] References Cited

U.S. PATENT DOCUMENTS

| 629,133 | 7/1899 | Knight et al. | 61/43 |
|---|---|---|---|
| 1,544,057 | 6/1925 | Dimick | 138/173 |
| 1,652,703 | 12/1927 | Cushman | 61/150 X |
| 2,189,207 | 2/1940 | Heath | 138/173 X |
| 2,738,488 | 3/1956 | MacKnight | 61/72.4 X |
| 2,746,090 | 5/1956 | Hoover | 61/45 R X |
| 3,265,269 | 8/1966 | Godderidge | 226/172 |
| 3,266,690 | 8/1966 | Goettsch | 226/172 X |
| 3,357,194 | 12/1967 | Fisher | 61/45 R |
| 3,581,506 | 6/1971 | Howard | 61/108 |
| 3,630,461 | 12/1971 | Sugasti | 242/54 |
| 3,680,342 | 8/1972 | Mott et al. | 226/172 X |
| 3,794,364 | 2/1974 | Williams | 138/173 |
| 3,855,835 | 12/1974 | Tisdale et al. | 61/108 |
| 3,983,905 | 10/1976 | Witzig | 138/173 X |
| 4,003,122 | 1/1977 | Overmyer et al. | 61/72.6 X |
| 4,073,156 | 2/1978 | Smith | 61/107 |

FOREIGN PATENT DOCUMENTS

| 163161 | 6/1955 | Australia | 61/72.1 |
|---|---|---|---|
| 1077331 | 7/1967 | United Kingdom | 61/72.3 |

OTHER PUBLICATIONS

Construction Methods and Equipment, p. 156, Mar. 1957.

Primary Examiner—Dennis L. Taylor

[57] ABSTRACT

In the laying of deepwater pipelines, corrugated pipe is substituted for standard pipe in order to take advantage of a substantially stronger structure of much lighter weight.

16 Claims, 3 Drawing Figures

INTERNAL LINER

CIRCUMFERENTIALLY CORRUGATED PIPE

PLASTIC FILLER

SPIRALLY CORRUGATED PIPE

CORRUGATED PIPELINE ON REEL

TENSIONER FOR GRIPPING PIPE

CORRUGATED PIPE FOR DEEPWATER APPLICATIONS

BACKGROUND OF THE INVENTION

When uniform cylindrical pipe is employed in very deep waters, especially beyond about 3,000 feet depth, the pipewall becomes very thick and the pipe becomes quite heavy. At these depths, pipewall thickness is governed by external collapse pressure, which implies that the wall thickness increases rapidly with depth, even for relatively high grades of steel. Cost for such pipe is very high, welding of field joints is tedious and expensive, and handling of heavy pipe spans is difficult for laying offshore pipelines in very deep waters.

The diameter-to-thickness ratio of a pipe determines whether it will have a negative or positive buoyancy. In depths of up to about 500 feet, it is common for a pipe to have a diameter-to-thickness ratio in the range from 40 to 100, which means that the pipe would float. Such a pipe requires a thick concrete coating to give it negative buoyancy. A diameter-to-thickness ratio of about 29.5 is the break-even point, i.e. below this ratio, the pipe will sink and above this ratio, the pipe will float. At about 2,000 feet, a diameter-to-thickness ratio of about 26 is needed just to resist external pressure, and of course, at this depth no concrete is required. At 3,000 to 4,000 feet, a diameter-to-thickness ratio of about 20 is needed to resist external pressure, and the pipe used at these depths is thus quite heavy.

Prior art pertinent to the present invention includes U.S. Pat. Nos. 2,910,835; 3,262,275; 3,454,051; 3,530,680; 3,550,639; 3,599,435; 3,847,185; 4,009,736.

SUMMARY OF THE INVENTION

The primary purpose of the present invention is to provide a stronger, thinner-walled, and correspondingly lighter pipe for laying pipeline in very deep waters. This purpose is realized by employing corrugated pipe in such environments. In a preferred embodiment, the corrugated pipe is internally lined to provide a smoother, corrosive-free interior surface.

DESCRIPTION OF PREFERRED EMBODIMENTS

Figure 1:
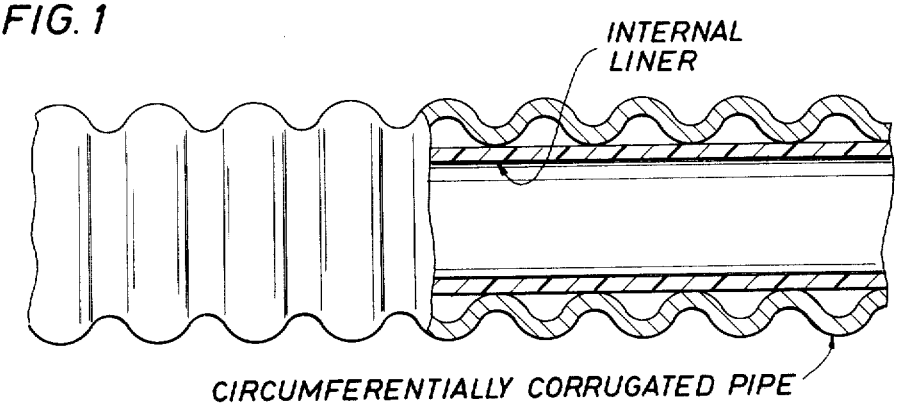
FIG. 1 shows circumferentially corrugated pipe having a tubular internal liner.
Figure 2:
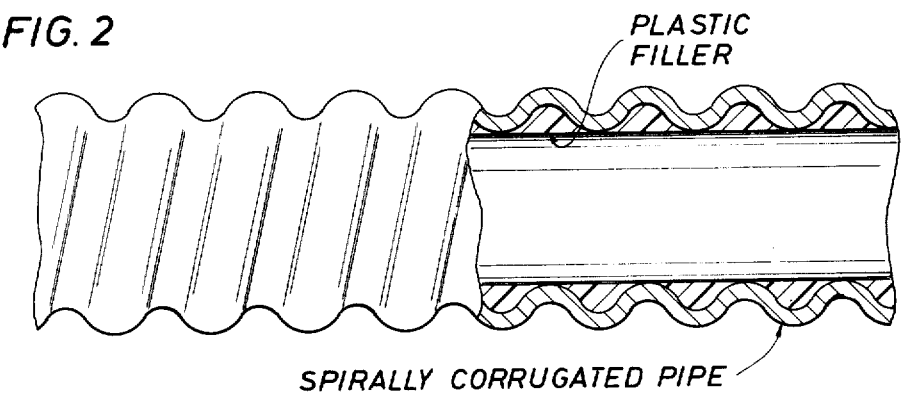
FIG. 2 shows spirally corrugated pipe having a plastic filler liner.
Figure 3:
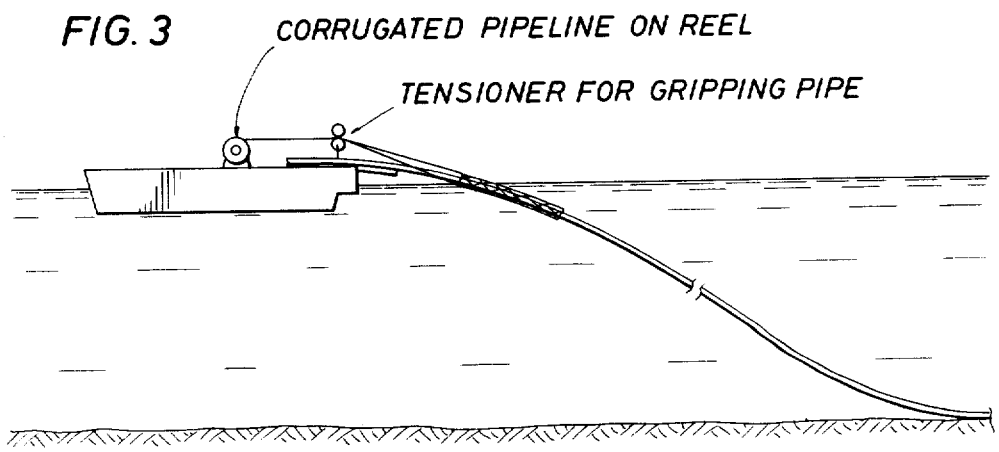
FIG. 3 depicts a vessel laying corrugated pipeline from a reel utilizing a tensioner for gripping the pipe.

The present invention employs corrugated metal pipe of steel, alloys of steel, or other metals or other alloys, for the laying of deepwater pipeline in order to provide a lighter, stronger structure for the application. To resist external pressures at depths of 2,000 feet or greater, a corrugated pipe can be made much thinner than a corresponding uniform pipe. This is because the collapse resistance of a pipe is governed by the circumferential or hoop stiffness which is much greater for a corrugated pipe. Wall thickness reduction of as much as ½ reduces the metal cost accordingly. Pipe weight is drastically reduced, thereby easing pipe-handling problems. Additional benefits of corrugated pipe include much greater tolerance to bending before buckling, thus allowing use of a shorter curved stinger in the pipeline laying process, and more secure gripping of the corrugated external pipe surface by a tension machine during pipeline laying. Furthermore, a corrugated pipe has less bending stiffness than a uniform pipe, which allows the pipe to conform better to the contour of the sea bottom.

Disadvantages of corrugated pipe include (1) higher pipe fabrication costs, (2) slightly larger diameter required for given throughput and pressure drop, (3) greater collection of corrosive fluids in low areas resulting in decreased reliability, (4) difficulty in passing of pigs and scrapers. The latter two problems are solved by employing a liner in the pipe which may be of plastic or other material, preferably a light material, so as not to add substantially to the weight of the pipe and obviate one of the main improvements of the present invention. The liner may be a pipe which fits inside the corrugated pipe and completely fills the grooves, spaces or valleys in the corrugations between peaks. The liner may be inserted after fabrication of the pipe, or fabricated in situ in the corrugated pipe. Thus, the inside of the liner may be made smooth to avoid the two above-noted problems, or it may be allowed to follow the corrugation of the pipe, in which case it may only somewhat reduce the above-noted problems while, on the other hand, substantially reducing problems with corrosion. Suitable plastics for liners include polyurethane, polyethylene, polypropylene, polyvinyl chloride, and epoxy, either plain or mixed with asphalt. Alternatively, a steel liner could be used which needs be only thick enough to resist internal pressure plus a corrosion allowance.

By a corrugated pipe, it is meant a pipe having the ridges or grooves of a corrugated surface in the walls thereof. Commonly, corrugations in a pipe go alternately from peak to valley to peak to valley, et cetera, and this term is well-accepted in the art. The corrugations may be essentially circumferential or may spiral about the pipe at a shallow pitch angle between about 0–45 degrees. Greater angles than this may enjoy some of the benefits of the invention, but it is clear that essentially longitudinal corrugations do not enjoy any of the benefits of the invention. There is some manufacturing advantage in using spiraling corrugations inasmuch as the mandrel forming the pipe may more conveniently be withdrawn from the pipe by a spiraling mode. Also, there may be some advantage in a spiraling corrugation in that the flow of the fluid in the pipe may tend to sweep out some of the fluid in the valleys, especially as the pitch angle increases. Of course, the disadvantages of having valleys inside the pipe may be overcome by the use of liners as above noted. The corrugations may all be of substantially uniform size or may be of irregular size; but, it is important that no more than about one diameter of smooth pipe be between the corrugations. An optimal peak-to-valley measure of the corrugations is about one to about three wall thicknesses. Greater corrugations lead to added expense and greater flow problems, and smaller corrugations do not add substantially to the collapse resistance of a cylindrical pipe. The corrugations may also be of a patterned sequence of large and small corrugations or may comprise large corrugations which are made up of small corrugations.

Benefits of the invention are enjoyed most beyond depths of 2,000 feet of water, and especially beyond depths of 3,000 feet of water. At depths of less than 2,000 feet, the extra expense of corrugated pipe generally outweighs any advantage to be realized.

The usual means of laying an offshore pipeline is a floating vessel, called a laybarge, upon which individual pipe joints are connected together in series, usually by welding, and then are launched into the water at the vessel stern. The pipe assembly way on the laybarge may be essentially horizontal, as for the "conventional" laybarge, or it may be inclined or essentially vertical, as in a drilling vessel. Another means of laying pipe is the reel barge or reel ship, which are vessels upon which corrugated pipe is stored by winding onto a large reel or spool. At the time of pipelaying, the corrugated pipe is unwound from the reel and is lowered to bottom over the vessel stern at relatively high speed. Any of the above-described means could be used to lay corrugated pipe onto the floor of a body of water.

For the conventional laybarge, an elongated pipe support structure, commonly called a stinger, is necessary to avoid excessive bending and possibly buckling of the pipe in the overbend region. Some form of stinger also may be used in conjunction with the vertical lay method and with the reel method of pipelaying. Tension is applied to the pipeline during laying by means of a tension machine mounted on the deck of the layvessel. The tensioning device is adapted to grip the corrugations of the pipe. Tension prevents the pipe from slipping overboard. Tension in excess of the pipe dead weight controls the curvature of the sagbend, and thus prevents buckling of the pipe near the sea bottom.

What is claimed is:

1. A method for using corrugated pipe, comprising providing the pipe with an inside liner having a laterally flat inside surface, forming a pipeline from corrugated pipe having a peak-to-valley measure of the corrugations of about one to about three pipe wall thicknesses, deploying the pipeline to a deepwater location at a depth of more than 2,000 feet of water and passing at least one of a pig and scraper through the pipeline.

2. The method of claim 1 wherein the pipeline is at least 3,000 feet below the water's surface.

3. The method of claim 1 wherein the corrugations run essentially circumferentially about the pipe.

4. The method of claim 1 wherein the corrugations run spirally about the pipe.

5. The method of claim 4 wherein the spiral has a pitch angle up to about 45°.

6. The method of claim 1 wherein the corrugations are of uniform size.

7. The method of claim 1 wherein the corrugations are of irregular size.

8. The method of claim 1 wherein the corrugations are a patterned sequence of large and small corrugations.

9. The method of claim 1 wherein the corrugations comprise large corrugations which are in turn made up of smaller corrugations.

10. The method of claim 1 wherein the corrugated pipe has an inside liner which has a laterally flat inside surface and a corrugated outside surface which mates with the inside surface of the pipe.

11. The method of claim 1 wherein the corrugated pipe has an inside liner which has a laterally flat inside surface and a laterally flat outside surface which contacts only the inside peaks of the corrugations.

12. The method of claims 11 wherein the liner is formed in situ in the corrugated pipe.

13. The method of claim 1 wherein the corrugated pipe is assembled from standard length joints on the deck of a laybarge and is disposed with a relatively short stinger of about 50 to 150 feet length.

14. The method of claim 1 wherein the corrugated pipe is assembled from standard length joints in an essentially vertical mode on the deck of a vessel and is disposed with or without a stinger.

15. A method for laying a deepwater pipeline from a vessel comprising, providing a pipeline having corrugations along the length thereof, gripping the pipeline with tensioners which grip the corrugations of the pipeline and tensioning the pipeline with the tensioners during the deployment of the pipeline from the vessel, whereby the corrugations facilitate tensioning.

16. A method for using corrugated pipe having a peak-to-valley measure of the corrugations of about one to about three pipe wall thicknesses, comprising forming a pipeline from the corrugated pipe, winding the corrugated pipeline on a reel, locating the reel onboard a vessel, and deploying the corrugated pipeline from the reel and vessel to an underwater location.

* * * * *